United States Patent [19]
Hasewinkle

[11] Patent Number: 5,330,275
[45] Date of Patent: Jul. 19, 1994

[54] APPARATUS AND METHOD FOR PRINTING A NEGOTIABLE INSTRUMENT IN AT LEAST TWO COLORS

[76] Inventor: William D. Hasewinkle, 1373 NW. 124 Ave., Pembroke Pines, Fla. 33026

[21] Appl. No.: 764,329

[22] Filed: Sep. 23, 1991

[51] Int. Cl.$^5$ ............................................. B41J 3/54
[52] U.S. Cl. ...................................... 400/82; 395/104
[58] Field of Search ............... 400/82, 137, 138.1, 400/127, 129, 130, 131, 708, 596; 395/104, 109; 346/1.1

[56] References Cited

U.S. PATENT DOCUMENTS

| | | | |
|---|---|---|---|
| 3,530,793 | 2/1970 | Ritzerfeld | 101/91 |
| 3,861,305 | 1/1975 | Sasaki | 101/336 |
| 4,069,755 | 1/1978 | Beery | 101/93.12 |
| 4,085,670 | 4/1978 | Poole | 101/76 |
| 4,157,783 | 6/1979 | Muster | 235/379 |
| 4,234,214 | 11/1980 | Lee | 283/57 |
| 4,328,749 | 5/1982 | Inouye | 101/93.12 |
| 4,459,052 | 7/1984 | Lundblad | 400/124 |
| 4,527,918 | 7/1985 | Yamamoto | 400/82 |
| 4,580,144 | 4/1986 | Calvi | 101/93.12 |
| 4,684,269 | 8/1987 | Miki | 400/82 |
| 4,702,630 | 10/1987 | Igi | 400/82 |
| 4,786,789 | 11/1988 | Gaucher | 235/432 |
| 4,901,114 | 2/1990 | Parker | 355/245 |
| 4,957,312 | 9/1990 | Morello | 283/89 |
| 5,081,596 | 1/1992 | Vincent et al. | 395/104 |
| 5,100,249 | 3/1992 | Wochinski et al. | 400/191 |
| 5,119,293 | 6/1992 | Hammond | 364/401 |

FOREIGN PATENT DOCUMENTS

| | | | |
|---|---|---|---|
| 56573 | 4/1985 | Japan | 400/82 |
| 295059 | 12/1986 | Japan | 400/82 |
| 317348 | 12/1988 | Japan | 395/104 |

Primary Examiner—David A. Wiecking
Attorney, Agent, or Firm—Peter Trzyna

[57] ABSTRACT

The present invention relates to a system for printing negotiable instruments in at least two colors. A non-impact printer is operable to print with toner in at least one color and a dot-matrix printer operable to print in at least one additional color. The printers are coupled to each other so that the paper output by one of the printers is received by another of the printers and activates the other of the printers. A computer is connected to the printers and operable to transmit information to be printed by each of the printers to produce a negotiable instrument printed in at least two colors.

30 Claims, 8 Drawing Sheets

FIG. 2

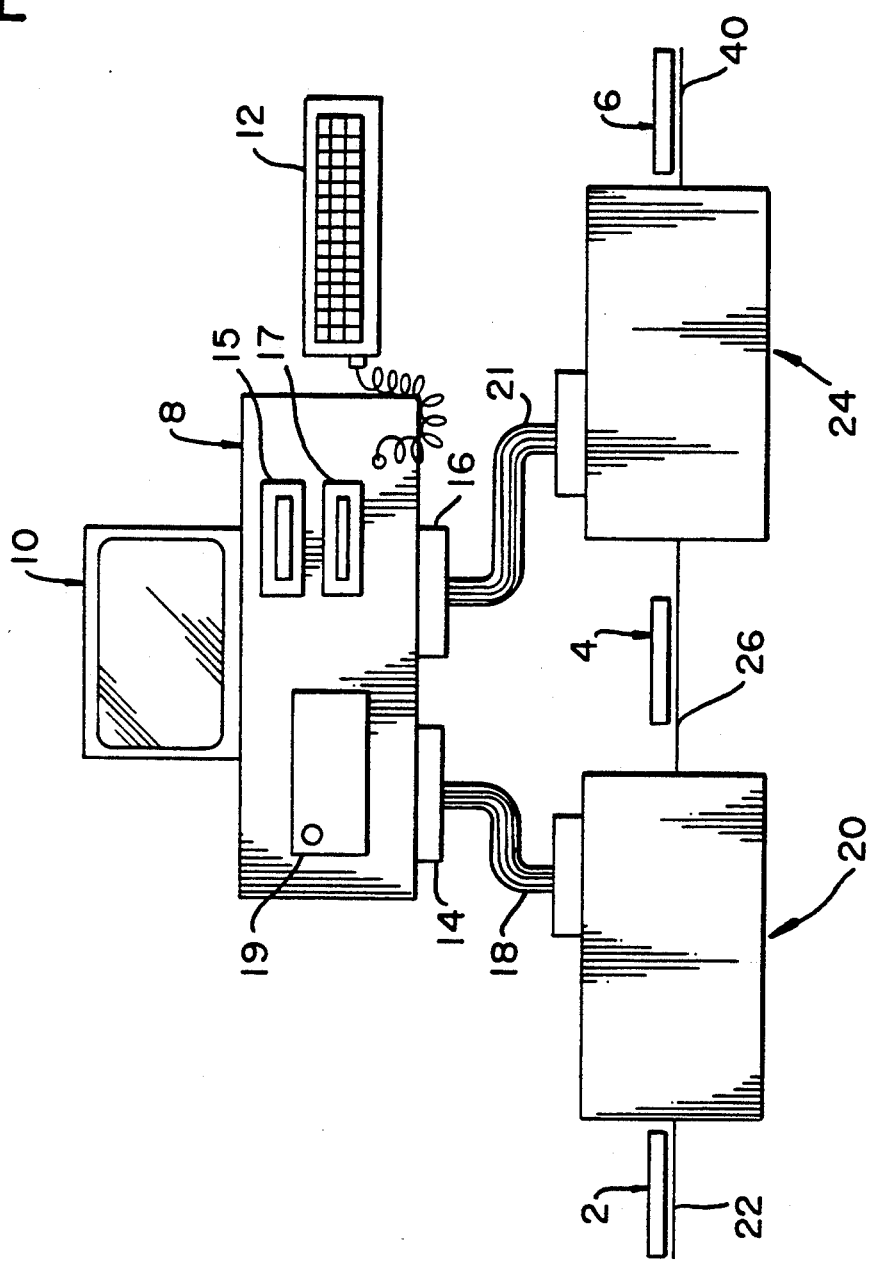

APPARATUS AND METHOD FOR PRINTING A NEGOTIABLE INSTRUMENT IN AT LEAST TWO COLORS

BACKGROUND OF THE INVENTION

1. Field of Invention

The present invention relates to a printing means and a method for progressive printing. The printing means includes two separate printers. The printers are unlike in that one is a non-impact printer and the other is a dot-matrix printer. The two printers together produce a negotiable instrument printed in at least two colors.

2. Description of the Related Art

There has been a need to provide negotiable instruments printed in high quality and with security information printed in at least one color. Some financial documents, such as checks, have been printed using the high quality of a laser printer or a xerographic printer. But there is a problem with using laser or xerographic printing processes to apply the security information: these processes do not provide a physical impact and penetrating ink to preclude alteration of the printing by, say, scraping off the ink or toner on the printed document. Though checks have been printed in color by dot-matrix printers to place information on the checks, these printers cannot also provide the high quality required by banks for a negotiable instrument.

Prior U.S. patents have mentioned the use of multiple printers to produce financial documents. For example, U.S. Pat. No. 4,901,114, titled "Tri-Level Xerography Using a MICR Toner in Combination With a Non-MICR Toner" ("PARKER"), shows the use of two xerographic printers, one for printing magnetic ink character recognition ("MICR") toner and the other for printing in color. U.S. Pat. No. 4,786,789, titled "Apparatus for Processing Vouchers, In Particular Checks" ("GAUCHER"), shows two dot-matrix printers. U.S. Pat. No. 4,069,755, titled "Ribbonless Endorser for Printing Both Fixed and Variable Information on Moving Documents" ("BEERY"), shows the use of a mechanical dot-matrix printer and a rolling stamp.

One problem with the use of multiple printers, though, is that it is relatively expensive to synchronize the two printers. Thus, for example, PARKER and GAUCHER involve continuous printing. Also, note U.S. Pat. No. 4,157,783, titled "Item Responsive Print Inhibiting Apparatus" ("MUSTER"), which uses markings on checks detected by a sensor to deactivate certain printers in a series of printers. Such approaches are tricky, relatively expensive, and for one reason or another, usually are unsuitable for use in automated teller machine ("ATM") applications or in office settings.

SUMMARY OF THE INVENTION

It is an object of the present invention to provide a system for printing a form for a negotiable instrument with high quality printing and security information with impacted, color printing.

It is another object of the present invention to print both alpha and numeric characters and graphics in at least one, preferably more than one color.

It is yet another object of the present invention to provide a two-printer system wherein the first printer is of letter quality or high quality, for example, a laser printer, light emitting diode printer, liquid crystal printer, or other non-impact printer; the second printer is an impact-type printer, for example, a mechanical dot-matrix printer.

Yet another object of the present invention is to provide a simplified, non-continuous feed, negotiable instrument printer system that can be employed to selectably produce a number of different kinds of negotiable instruments in selectable amounts.

It is still another object of the present invention to provide a straightforward means to activate a second printer in a multi-printer printing system.

Other objectives and advantages of the present invention will become apparent from the following summary of the invention, drawings, and detailed description of the invention and its preferred embodiment. As used herein, the term "negotiable instrument printer system" is defined as an assemblage of at least two printers, one being a non-impact printer and the other printer being an impact printer, which collectively produce a negotiable instrument. A "negotiable instrument" is defined in state law; typically, it is a signed, unconditional promise to pay a sum certain in money. See, for example, Article 3 of the Uniform Commercial Code.

As disclosed in the embodiment of the invention presented herein, the negotiable instrument printer system has a first printer that is a high quality, non-impact printer, such as a laser printer. The first printer prints a form for a negotiable instrument. The negotiable instrument printer system also has a second printer, which is an impact printer, such as a mechanical dot-matrix printer, for printing in at least one color. The printers are controlled by a computer to collectively print a negotiable instrument in at least two colors. Although the embodiment of the invention disclosed herein has the non-impact printer preceding the mechanical dot-matrix printer, the opposite sequence is an acceptable alternative in so far as the printers would in either case collectively print the negotiable instrument.

BRIEF DESCRIPTION OF THE DRAWINGS

FIG. 2 is a specimen representing a negotiable instrument printed according to an embodiment of the present invention.

FIG. 3 is a block diagram of the negotiable instrument printer system according to an embodiment of the present invention.

(In FIG. 7b, the printer 44 and the chute 42 are removed for clarity.)

DETAILED DESCRIPTION OF A PREFERRED EMBODIMENT OF THE INVENTION

Figure 1:
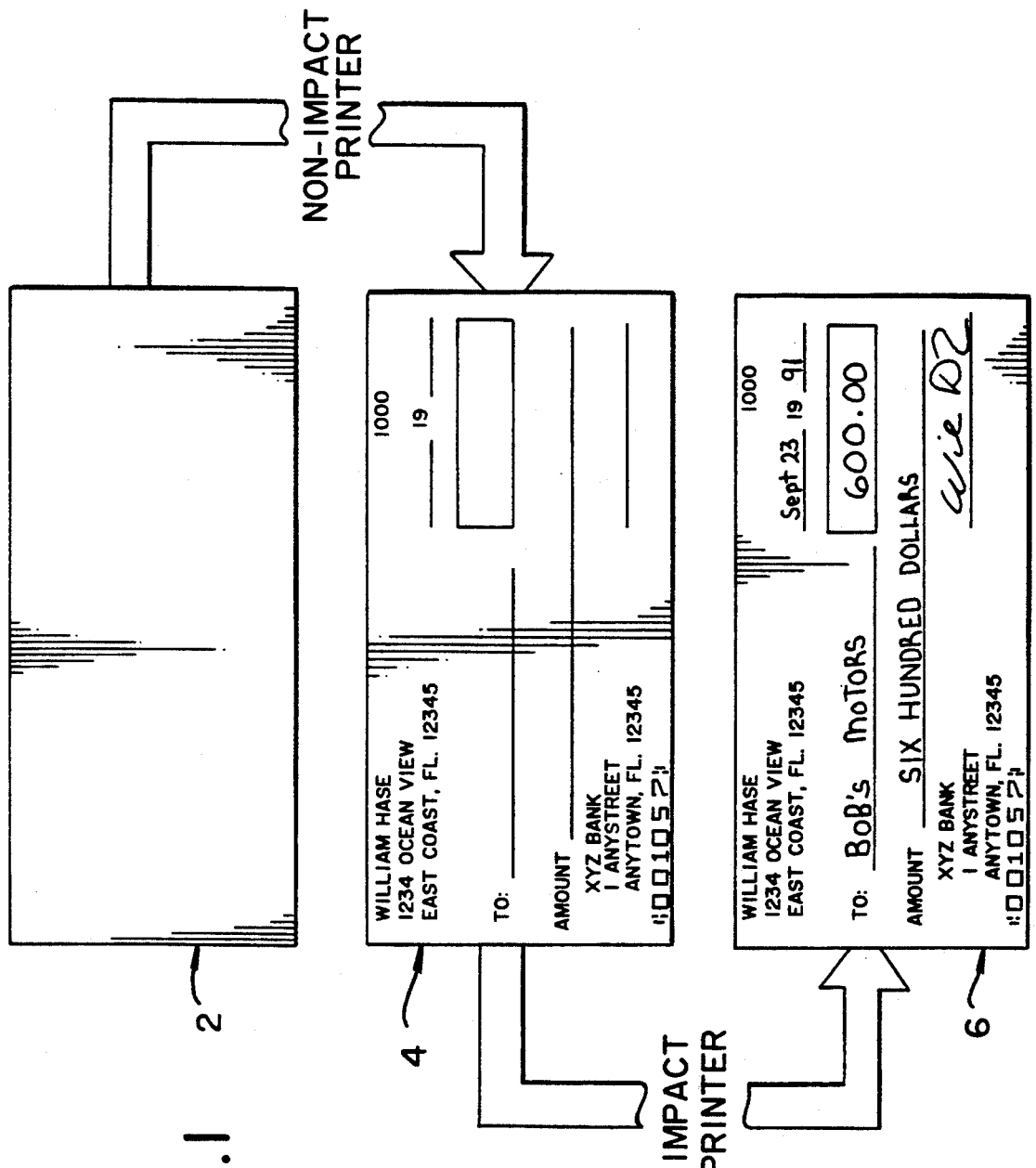
FIG. 1 is a diagram showing three stages of printing a negotiable instrument according to an embodiment of the present invention.

FIG. 1 is a diagram showing three stages of printing a negotiable instrument according to an embodiment of the present invention. The first stage begins with a blank document 2, which can be 8½×11 inches, 8½×14 inches, or of such other dimensions as may be desired. Blank document 2 can be white or colored. Preferably, though, blank document 2 is 8½×11 inches and has either a pre-printed safety pattern or is MICR bond paper or safety-security paper.

The subsequently described non-impact printer prints information on the blank document 2 to produce form 4. Form 4 is not a negotiable instrument. Rather, it is an instrument having neatly presented blanks and spaces to be filled-in by a subsequently described second printer. Preferably, blank document 2 also has receipt information (not shown in FIG. 1, but shown in FIG. 2) printed to document a financial transaction. Preferably, form 4 has the format for a negotiable instrument and also has two vouchers (i.e., receipts or explanations of the payment) printed on document 2.

The subsequently described second printer adds information to form 4 to complete the negotiable instrument 6 in at least one color—preferably in more than one color. This color-printed information includes the date and the amount in numerics, the "paid to" party, and the amount in alpha characters, and the signature(s) in graphics, as is more clearly shown in FIG. 2.

Figure 2:
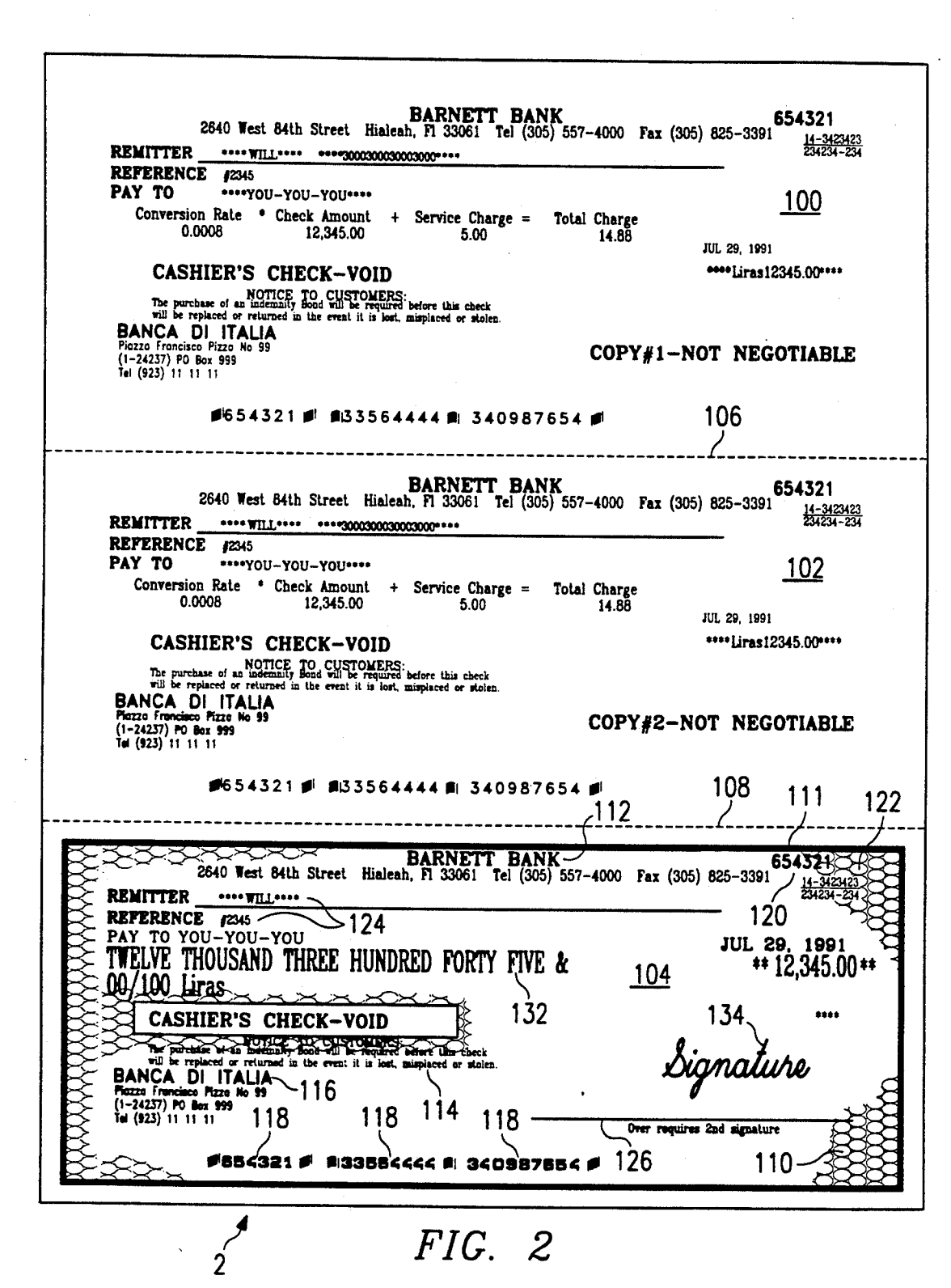

FIG. 2 shows a specimen of a negotiable instrument printed according to an embodiment of the present invention. The specimen is printed on a blank document 2 that is divided into thirds 100, 102 and 104 by pre-printed yellow ink or toner lines 106 and 108. The bottom third 104 is printed on a safety pattern 110 to discourage forgery of the negotiable instrument 6. In the illustrated embodiment, pattern 110 and frame 111 are printed in purple.

The subsequently described first printer prints the ink or toner that is "black" on FIG. 2, including, in this embodiment, all matter printed in sections 100 and 102. The upper two thirds 100 and 102 are the receipts or vouchers. The black portions of the bottom section 104 make up the form 4 for making negotiable instrument 6.

In the illustrated embodiment, the black portions printed by the first printer include "REMITTER," the name and address of the bank at 112, "REFERENCE", "PAY TO", "CASHIER'S CHECK—VOID", the notice to customers at 114, the name and address of the BANCA DI ITALIA at 116, the numbers at 118, the check number at 120, numbers 122, "PAY TO", the name and reference number of the remitter at 124, and the signature line and caption at 126.

The subsequently described second printer prints the information complete negotiable instrument 6. The use of colored ink, preferably more than one color, also discourages forgery. That is, the color(s) make alteration difficult because the ink producing the color penetrates the paper fibers of negotiable instrument 6. Accordingly, an attempted alteration could destroy the paper on which the negotiable instrument 6 is printed.

Figure 2A:
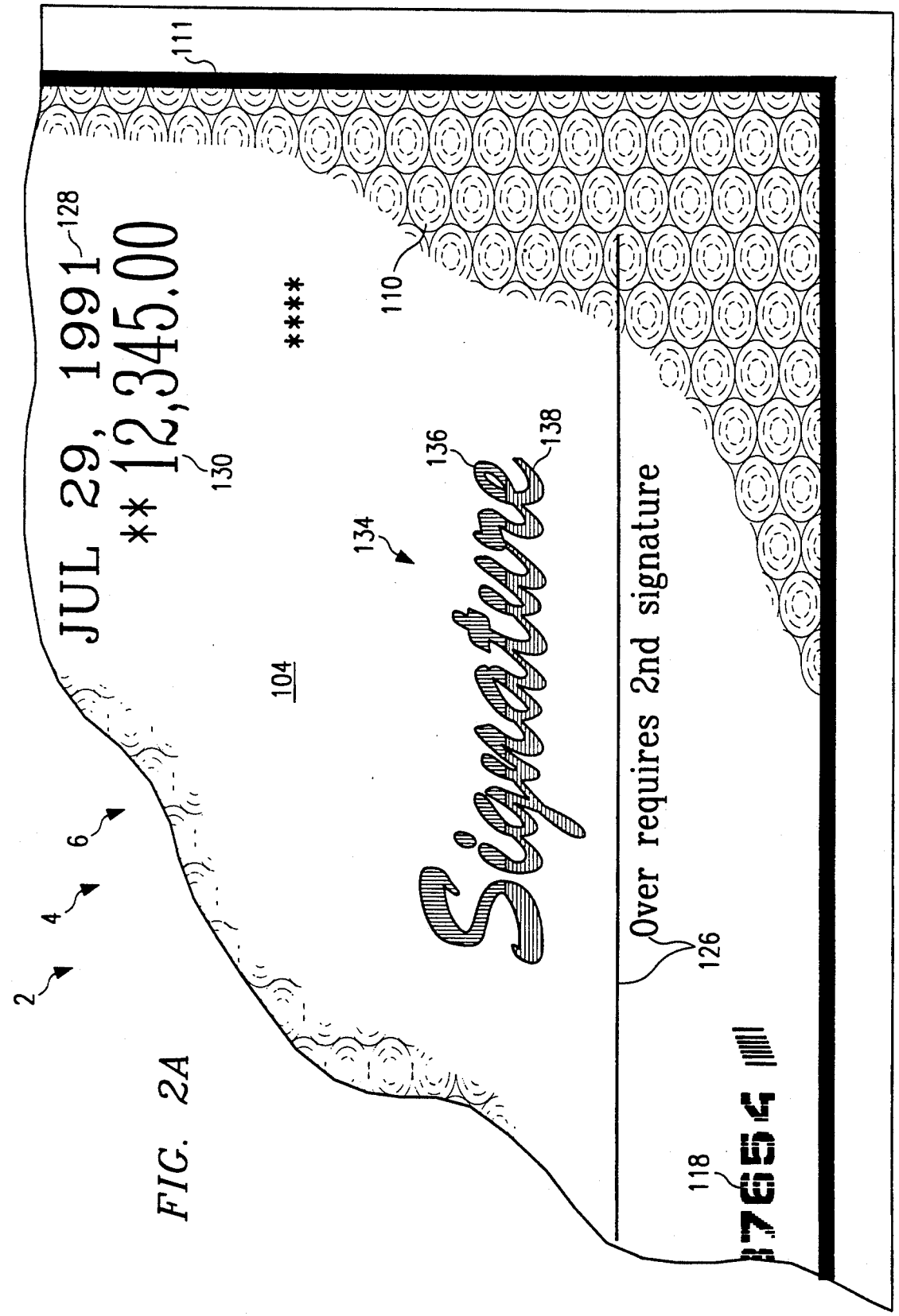
FIG. 2A is an enlarged detail of the lower right-hand corner of the specimen illustrated in FIG. 2, certain portions thereof being lined for color.

In the embodiment illustrated in FIG. 2, the colored portions include the name of the payees "YOU-YOU-YOU" in red. Other colored portions are best shown in the detail of FIG. 2A. The date 128 appears in red. The numerical amount 130 and the written-out amount 132 (FIG. 2) are printed in blue. The signature 134 may be printed in multiple colors; in the illustrated embodiment, a top portion 136 is printed in red, while a bottom portion 138 is printed in blue.

FIG. 3 shows a diagram of the negotiable instrument printer according to an embodiment of the present invention. There is a computer 8, for example, an IBM-compatible computer such as a BTI computer with a 386 processor operating at 25 megahertz, with a 80 megabyte hard disc 19 and two floppy disc drives 15 and 17. The computer 8 has a VGA monitor 10, an input keyboard 12, and two parallel printer ports 14 and 16. A printer cable 18 connects the computer 8 to a first printer 20. Printer 20 is a non-impact printer, for example, a laser printer, such as a CI15 printer (CITOH) or a V5000 Vistron printer. A second printer cable 21 connects computer 8 with the second printer 24, a wire dot-matrix printer, also known as a "mechanical dot-matrix printer," such as the model C-610+ printer sold by C-ITOH and manufactured by the Tokyo Electric Company. The first printer 20 is linked to the second printer 24 by a guide 26 that can convey form 4 into the second printer 24 to print negotiable instrument 6.

Figure 4:
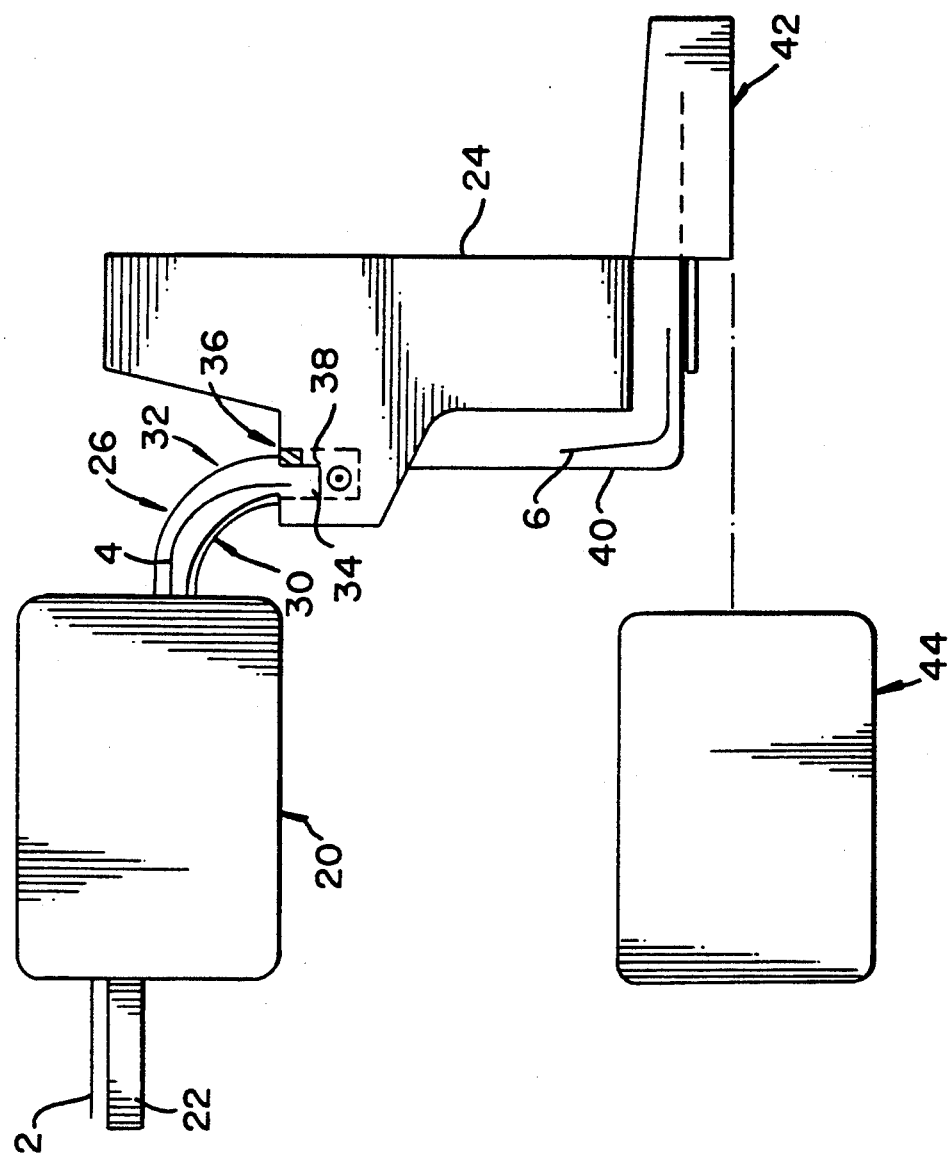
FIG. 4 is a side view schematically illustrating and the negotiable instrument printer system and a method of using the negotiable instrument printer system to print a negotiable instrument according to an embodiment of the present invention.

FIG. 4 is a side view schematically illustrating the negotiable instrument printers 20 and 24 for an embodiment of the present invention. The blank document 2 begins in a paper bin 22 of first printer 20. When the first printer 20 receives information to print form 4 (from computer 8, which is not shown in FIG. 4), the blank document 2 is drawn from the paper bin 22 and into the printer 20, where form 4 is printed (and fused, if toner is used).

The first printer may be used to print magnetic code printing, in the format known as Magnetic Ink Character Recognition ("MICR") on the negotiable instrument blank by using magnetic toner. This operation is directed by the computer program controlling the apparatus, the code for which is attached as an appendix to this specification.

Form 4 is ejected out of printer 20 onto a guide 26. Guide 26 has a curved metal plate 30 covered by a flexible sheet 32 of polypropylene plastic. The curved metal plate 30 and sheet 32 extend from the printer 20 into a throat 34 of printer 24. Sheet 32 is held under tension against plate 30 weight 36 attached to sheet 32.

Printer 20 pushes form 4 out onto the guide 26, between the curved metal plate 30 and the sheet 32. Printer 20 overfeeds form 4 by ½ to 1 inch longer than the arcuate length of plate 30 so that just before printer 24 grabs form 4, form 4 bulges upward from plate 30 and raises sheet 32 and weight 36, which maintains a positive feed pressure on form 4. The leading edge of form 4 triggers a switch 34, which activates a document feed sequence of printer 24. Form 4 is then pulled into the printer 24, which completes the printing of negotiable instrument 6.

Negotiable instrument 6 is then pushed out of the printer 24 and on to output guideway 40. Output guideway 40 is an L-shaped metal passage that conveys negotiable instrument 6 to a chute 42.

Preferably, the present invention can be incorporated into an ATM machine having other equipment for performing other financial transactions. For example, there can be a third printer 44 for printing checks or other documents under the control of computer 8. These other documents can also be output through chute 42.

Figure 5:
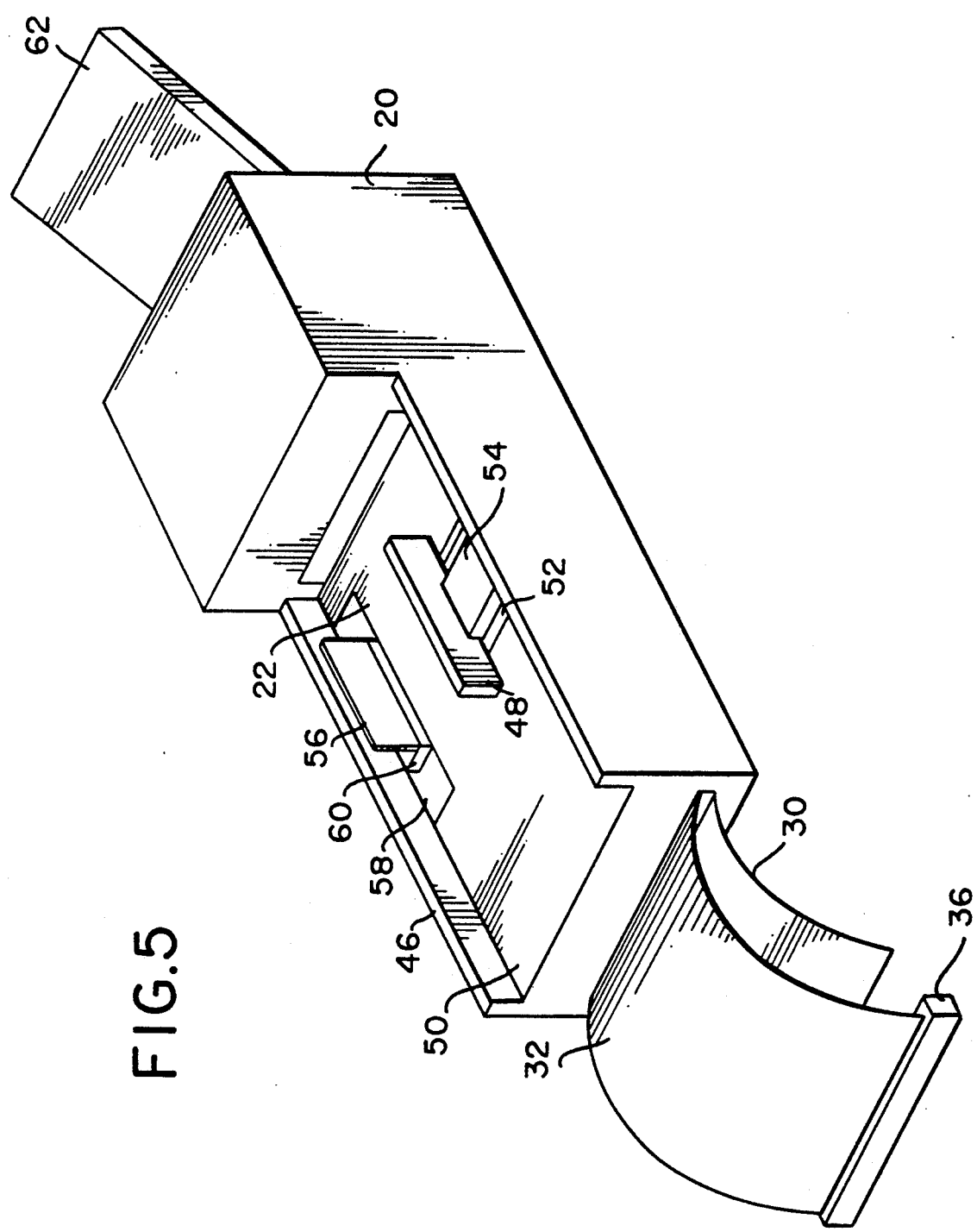
FIG. 5 is an angled view of the non-impact printer.

Turning to FIG. 5, the first printer 20 is illustrated in greater detail. A horizontal paper bin 22 is defined by two guides 46 and 48 and base 50. Guide 48 is slidably mounted in a slot 52 in base 50. Movement of guide 48 can be fixed by insertion of spacer 54 in the slot 52. The other guide 46 is fixed (or has limited adjustability) to base 50.

An aluminum L-shaped guide 56 is located next to guide 46, inside the bin 22. The L-shaped guide 56 is magnetically adhered to a metal plate 58 sized larger than an adhering base 60 of the L-shaped guide 56. Metal plate 58 is attached to a base 50 of paper bin 22. The magnetic adherence is for permitting movement of the L-shaped guide 56 to snugly locate the blank document 2 paper between guides 46 and 48.

There is a second paper bin 62, called a "vertical paper bin," obtusely angled from a plane defined by the base 50 the horizontal paper bin 22. The second paper bin 62 has the same type of guide arrangement as described with respect to the first paper bin 22. There can be a third paper bin for printing envelopes or smaller documents. Accordingly, by means of the two paper bins 22 and 62, different types of paper can be provided for document 2 at the control of computer 8.

Figure 6:
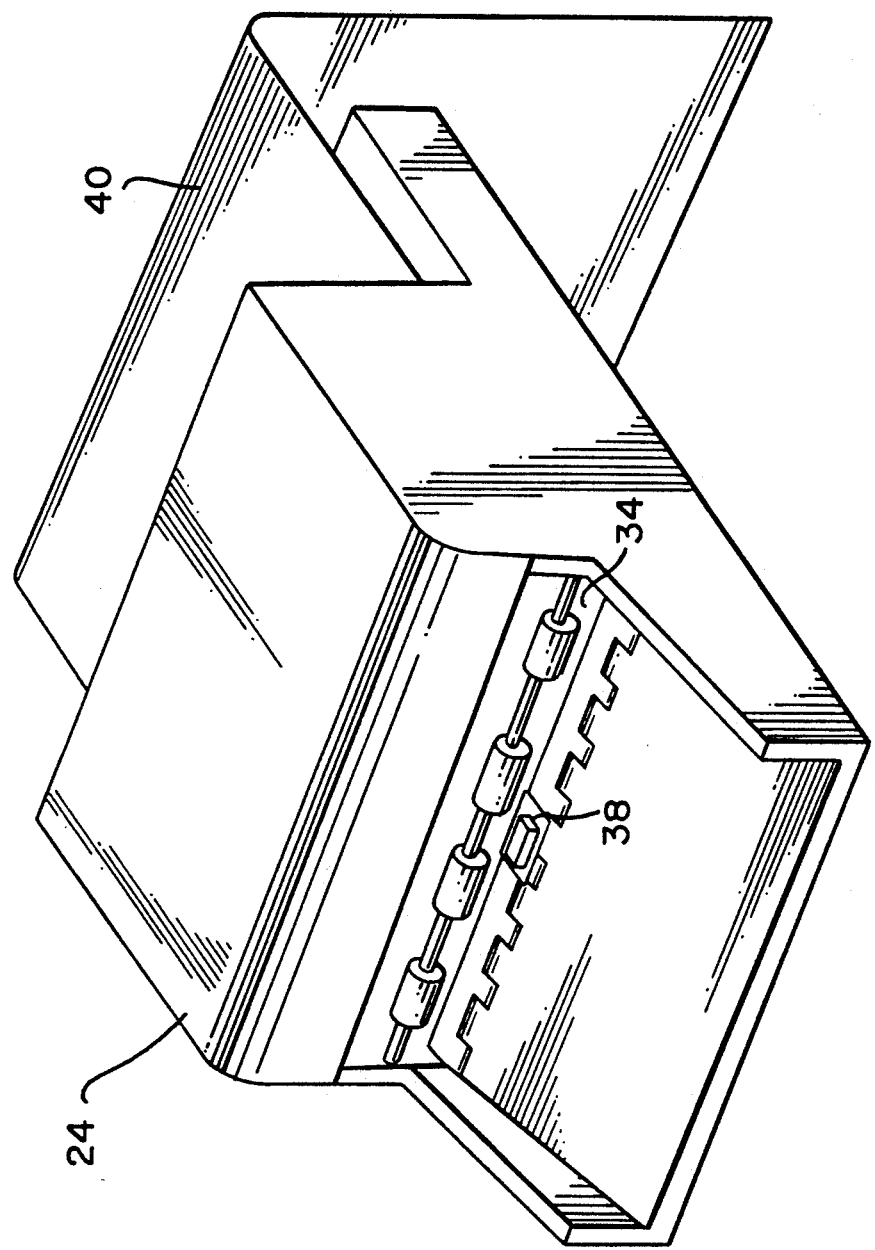
FIG. 6 is an angled view of the impact printer.

As shown in FIG. 4, guide 26 spans from printer 20 to printer 24, and FIG. 6 shows a detailed view of the second printer 24, which is preferably oriented at about 90° to printer 20. As previously mentioned, form 4 is pushed through guide 26 into the throat 34 of printer 24. The leading edge of form 4 engages switch 38 to activate a document feed sequence of printer 24. Switch 38 is a mechanical switch, though other switches could be used, e.g., optical or electro-optical switches.

Printer 24 can have a colored ribbon, preferably a multi-color ribbon that is mechanically positioned so that the printer head strikes more than one color. A motor in printer 24 advances the ribbon uniformly across a printer head of dot-matrix printer 24 so that alpha and numeric characters and graphics (for the signature(s)) can be printed in color(s). Alternatively, the ribbon can be moved upwards and downwards (because the printer 24 is in a vertical position) as it passes the printer head to print with a periodic pattern of varying color by instructions added to the subsequently described computer program. In any case, printer 24 completes the printing of the negotiable instrument 6, which is ejected to an L-shaped output guide 40 affixed to printer 24 to convey negotiable instrument 6 to a chute 42.

Computer 8 (shown in FIG. 3) has a computer program, and the code for the program is being filed as an appendix hereto. Generally, though, the computer program specifies which parts of the negotiable instrument 6 should be printed by each of printers 20 and 24. The kind of negotiable instrument to be printed is selectable from a menu displayable on the monitor 10. The computer program also permits a user to input the amount of money desired for the negotiable instrument via keyboard 12. In addition, the user can input the "remitter" party, the "pay to" party, a reference number or name, and optionally, a bank selection. Further, the computer program obtains a signature for the negotiable instrument from a database accessible by the computer program in response to an input to keyboard 12.

Figure 7A:
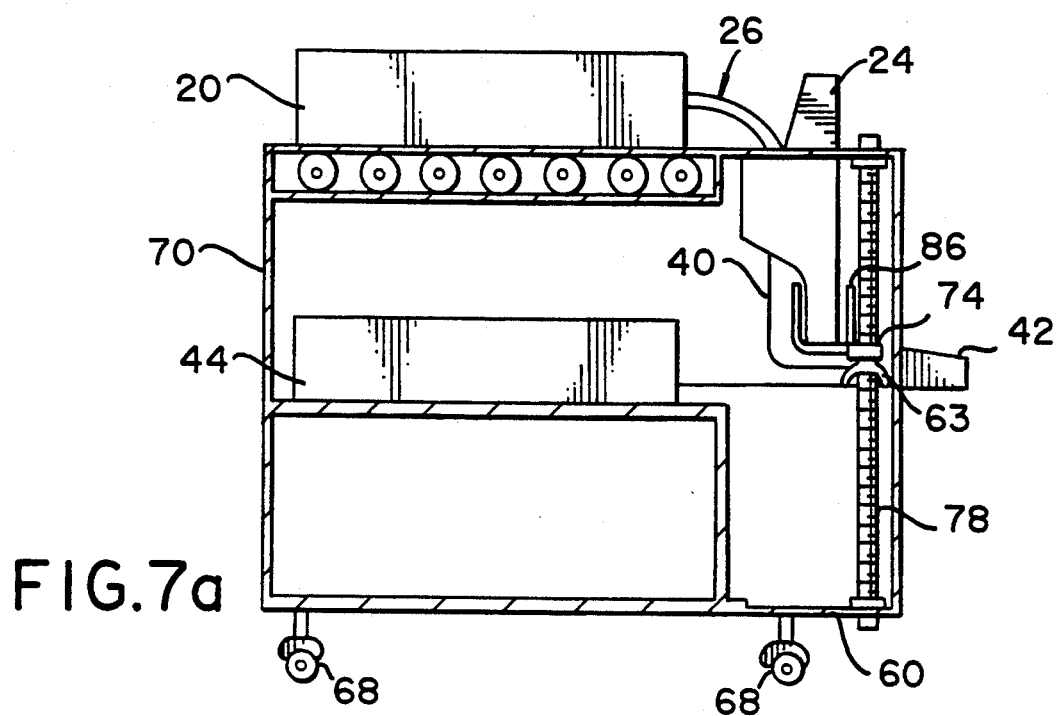
FIG. 7a is a side view of a rack and the printers.
Figure 7B:
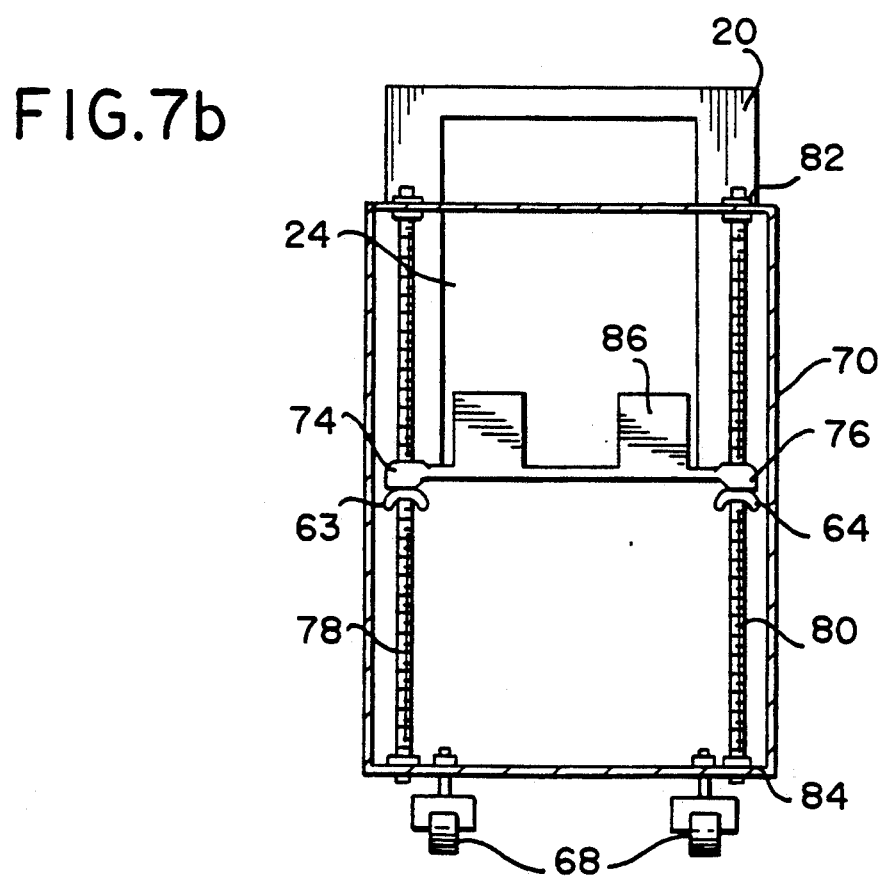
FIG. 7b is a front view of the rack showing adjustments that can be performed to space and align the printers.

FIG. 7 has two subparts: FIG. 7a shows the side and FIG. 7b shows the front of a steel rack 46 for supporting the negotiable instrument printer of the present invention. Printer 20 is mounted to rack 70 in a horizontal orientation, and printer 24 is mounted to rack 70 in a vertical orientation, at about 90° from printer 20. This can be an advantageous orientation to save space in ATM and office applications. However, other orientations are also workable.

Printers 20 and 44 can be located on roller (drawer) slides to permit easy maintenance. For similar purposes, rack 70 has four wheels 68.

The printers 20 and 24 are adjustably mounted to the rack 70. Printer 24 is mounted in a cradle 86 that is attached to juxtally opposed brackets 74 and 76 that, in turn, each receive ⅜ths inch, steel, continuously threaded bolts 78 and 80. Each of the threaded bolts 78 and 80 is attached to a top support 82 and a bottom support 84, the supports being affixed to the rack 70. Wing nuts 63 and 64 engage the threads of respective bolts 78 and 80 and can be rotated to move the cradle 86. Thus, the printer 24 can be moved in an upward or downward position to align it with printer 20.

The upward and downward adjustment can be useful for changing the distance between the printers 20 and 24, to accommodate different paper lengths. Alternatively, or in addition, printer 20 can be physically moved away from printer 24 to a predetermined location for each length of paper.

What is claimed is:

1. A system for producing a negotiable instrument printed in at least two colors, the system comprising:
    a stand-alone non-impact printer operable to print in at least one color;
    a stand-alone impact-type dot-matrix printer operable to print in at least one additional color, the stand-alone printers positioned with respect to each other so that paper output by one of the stand-alone printers is received by the other of the stand-alone printers;
    means on the other of the stand-alone printers for detecting the presence of the paper in an input position, and means responsive to said detection for activating the other of the stand-alone printers to print on the paper; and
    a computer connected to each of the stand-alone printers and programmed to transmit information to be printed to each of the stand-alone printers to produce the negotiable instrument printed in at least two colors.

2. The system of claim 1, wherein the stand-alone impact-type dot-matrix printer is operable to print in at least two colors.

3. The system of claim 2, wherein the stand-alone impact-type dot-matrix printer is a mechanical printer.

4. The system of claim 2, wherein the stand-alone non-impact printer is a laser printer.

5. The system of claim 1, wherein the stand-alone printers are not continuous feed printers.

6. The system of claim 1, wherein the stand-alone printers are positioned with respect to each other so that a leading edge of the paper output by the one of the stand-alone printers triggers a mechanical switch in the other of the stand-alone printers to activate said other of the stand-alone printers.

7. The system of claim 1, wherein the computer is programmed so that the stand-alone impact-type dot-matrix printer prints alpha and numeric characters and a signature in more than one color.

8. The system of claim 1, wherein the stand-alone printers are located on a rack such that at least one of the stand-alone printers is adjustably locatable with respect to the other of the stand-alone printers.

9. The system of claim 1, wherein the stand-alone printers are not in coplanar alignment.

10. The system of claim 1, wherein the stand-alone printers are in orthogonal alignment.

11. The system of claim 1, wherein the stand-alone printers are positioned with respect to each other so that the paper output by the one of the stand-alone printers is overfed into the other of the stand-alone printers.

12. The system of claim 1, wherein the stand-alone non-impact printer is a stand-alone laser printer, the stand-alone impact-type dot-matrix printer is a stand-alone mechanical printer, and the stand-alone printers are positioned with respect to each other so that paper output by the stand-alone laser printer is overfed to the stand-alone impact-type mechanical dot-matrix printer.

13. The system of claim 12, wherein an arcuate guide directs the paper between the stand-alone printers.

14. The system of claim 12, wherein the stand-alone impact-type mechanical dot-matrix printer is operable to print in at least two colors.

15. The system of claim 1, wherein:
one of said stand-alone printers is operatively adapted to eject said paper output along an output path and the other of said stand-alone printers is adapted to receive said paper output along an input path; and further comprising
an arcuate guide member joining said output path and said input path; and
a flexible weighted sheet overlying said arcuate guide member and defining an arcuate output path between said arcuate guide member and said sheet member;
whereby when said paper output from said first stand-alone printer is overfed to said second stand-alone printer, said flexible weighted sheet will urge said paper output into said second stand-alone printer along said arcuate path.

16. The system of claim 15, wherein said output path is substantially normal to said input path.

17. The system of claim 1, wherein one of said stand-alone printers is operable by means including said programmed computer to print MICR characters.

18. The system of claim 1, wherein the stand-alone impact-type dot-matrix printer prints with ink which is impacted with and penetrates the paper.

19. The system of claim 18, wherein said ink is provided by a ribbon and said stand-alone impact-type dot-matrix printer is of the wire type.

20. A method for printing a negotiable instrument in at least two colors, the method comprising the steps of:
printing a form for a negotiable instrument on paper in toner of at least one color with a stand-alone non-impact printer controlled by a programmed computer;
printing information in at least one additional color on the paper with a second stand-alone printer, the information being controlled by the programmed computer, to produce a negotiable instrument printed in at least two colors; and
guiding the paper from the first stand-alone printer to the second stand-alone printer so that the paper triggers a switch to turn on a document feed sequence of the second stand-alone printer;
wherein one of the stand-alone printers is an impact-type, stand-alone, dot-matrix printer and another of the stand-alone printers is a non-impact type stand-alone printer.

21. The method of claim 20, wherein the stand-alone non-impact printer is operable by means including said programmed computer to print MICR characters on a portion of said paper.

22. The method of claim 20, wherein the step of printing information with one of the stand-alone printers includes printing in at least two colors.

23. The method of claim 22, wherein the step of printing in at least two colors includes producing a periodic pattern of varying color.

24. The method of claim 20, wherein the step of printing information includes printing in ink.

25. The method of claim 20, wherein the step of printing the information comprises printing information in numeric and alphanumeric multi-colored characters and a signature in multi-colored graphics.

26. The method of claim 20, wherein the step of guiding includes guiding the paper through an arcuate path defined between an arcuate guide member and an overlying weighted flexible sheet to direct the paper into the second stand-alone printer.

27. The method of claim 25, further comprising the step of locating the stand-alone printers on a rack so that the stand-alone printers are not in a coplanar alignment.

28. The method of claim 27, wherein the step of locating the stand-alone printers is carried out with the stand-alone printers located in orthogonal alignment.

29. The method of claim 20, further comprising the step of overfeeding the paper output by the first stand-alone printer to the second stand-alone printer.

30. The method of claim 20, wherein the steps of printing and guiding are carried out with the stand-alone non-impact printer being a stand-alone laser printer, the stand-alone impact-type dot-matrix printer being a stand-alone mechanical dot-matrix printer, and the stand-alone printers being positioned so that the paper output by the stand-alone laser printer is overfed to the stand-alone mechanical dot-matrix printer.

* * * * *